Figure 1:
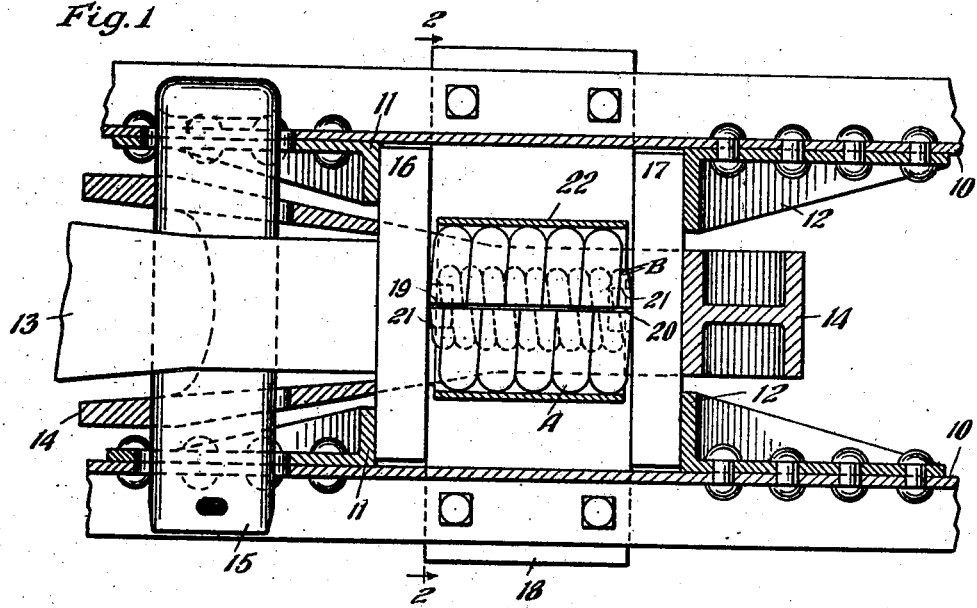

Dec. 19 1922.  1,439,374

J. F. O'CONNOR,
HIGH CAPACITY SPRING,
FILED JAN. 31, 1921.

Witnesses
Wm. Geiger

Inventor
John F. O'Connor
By Geo. I. Haight
His Atty.

Patented Dec. 19, 1922.

1,439,374

UNITED STATES PATENT OFFICE.

JOHN F. O'CONNOR, OF CHICAGO, ILLINOIS, ASSIGNOR TO WILLIAM H. MINER, OF CHAZY, NEW YORK.

HIGH-CAPACITY SPRING.

Application filed January 31, 1921. Serial No. 441,127.

*To all whom it may concern:*

Be it known that I, JOHN F. O'CONNOR, a citizen of the United States, residing at Chicago, in the county of Cook and State of Illinois, have invented a certain new and and useful Improvement in High-Capacity Springs, of which the following is a full, clear, concise, and exact description, reference being had to the accompanying drawings, forming a part of this specification.

This invention relates to improvements in high capacity springs.

In shock absorbing devices of high capacity, as for instance, railway draft riggings, it is the general practice to employ either alone or in combination with friction creating elements, a heavy spring. Heretofore, these springs, which are made of relatively large diameter rods, have been formed at their ends with so-called tapered flanges in order to provide flat bearing seats at the ends of the spring. In manufacturing such springs, it is first necessary that the ends of the rod before coiling be hammered or forged to provide the tapered tangs and in coiling the rods, the forward ends must first be clamped in proper position and the rear ends of the rods held by tongs in the hands of the operator who is required to exert great strength in preventing the rods from twisting to insure that the rear tang retains its proper position in the finished coiled spring. Experience has shown that much waste is entailed in manufacturing springs of this character due to the human element entering into the coiling thereof, the operators frequently becoming fatigued after a few hours' work and unable to maintain the position of the rear tang with the result that many of the coils must either be rejected or subsequently ground to provide the flat bearings.

It is also a well known fact that in the ordinary helically coiled spring, the capacity of a spring having a plurality of continuous coils is no greater than that of a single turn or coil of 360°, assuming the same diameters of rods, same pitch and same diameters of the coils. Where such springs of multiple continuous coils are employed in a friction draft gear, for instance, the total capacity of the spring provides only a relatively small proportion of the total capacity of the friction draft gear, the major portion of the capacity being necessarily imposed upon the friction elements. Furthermore, where such springs are employed without friction elements in draft gears, the capacities are limited because of the small space allowed for the draft gears on railway cars.

One object of my invention is to provide a spring suitable for heavy duty as for instance in railway draft gears used either alone or in combination with friction elements wherein the cost of manufacture is materially reduced as compared to the present practice; the accuracy of results is increased; and the total capacity of the complete spring is multiplied several times compared with the usual commercial springs employed in similar services.

More specifically, the object of my invention is to provide a high capacity spring composed of a plurality of independent single turn coils, each having squared off ends and wherein the total capacity is a multiple of the capacity of each individual coil.

Figure 2:
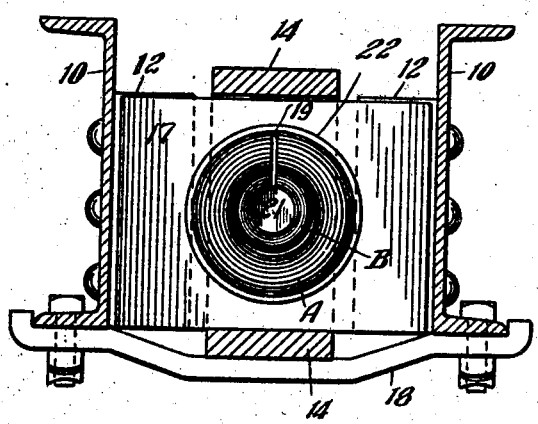
Figure 3:
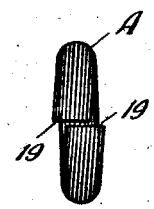
Figure 4:

In the drawing forming a part of this specification, I have illustrated my improvements in connection with a railway draft rigging and in said drawing, Figure 1 is a horizontal, longitudinal, sectional view of a portion of a railway draft rigging showing my improvements in connection therewith, all of the parts being shown in normal or full release position. Figure 2 is a vertical, transverse, sectional view corresponding substantially to the line 2—2 of Figure 1. Figure 3 is an elevational view of one of the coil units of the outer spring illustrated in Figures 1 and 2. And Figure 4 is an elevational view of a unit of the smaller nested spring illustrated in Figures 1 and 2.

In said drawing, 10—10 denote channel center or draft sills of a railway car, to the inner faces of which are secured front stop lugs 11—11 and rear stop lugs 12—12. The rear portion of a drawbar is indicated at 13, the same being operatively connected with the shock absorbing device proper by means of a hooded cast yoke 14 and coupler key 15. As customary in railway draft riggings, I employ a front main follower 16 and a rear main follower 17, normally engaging with the rear stop lugs and front stop lugs respectively, said followers and the spring interposed therebetween being confined within the yoke 14. Said yoke and parts contained therein are supported by a detachable saddle plate 18 secured to the bottom flanges of the draft sills 10.

In carrying out my invention, I employ a spring preferably having an outer series of coils of relatively large diameter rods and an inner nested series of lighter relatively smaller diameter rod coils. As shown, the outer series comprises five coil units A—A and the inner series comprises nine coil units B—B. Each of the outer units A extends thru an arc of substantially 360° and is coiled to the desired pitch, all of said units being coiled in the same direction. Each of said units A has its two ends formed flat or squared off as indicated at 19—19, said ends 19—19 partially overlapping each other in the instance shown, due to the comparatively small helical pitch. The same is also true of the inner coil units B which have similarly squared off ends 20—20.

As clearly shown in the drawing, all the units of each series are superimposed, one upon the other in true axial alinement so that each coil is in full line contact thruout the complete arc of substantially 360° with each adjacent unit. It will be noted that one squared end of one unit not only partially overlaps the other squared end of the same unit but also partially overlaps the opposing end of the next adjacent unit.

Where the improved spring is employed in a draft gear, I prefer to form studs 21—21 on the inner sides of the main followers over which the end coil units B of the inner series are seated to prevent any displacement of the spring. Preferably, I also employ a tubular shell or casing 22 surrounding the outer series, the length of said casing 22 being less than the normal distance between the followers 16 and 17 in order to permit compression of the spring.

Assuming the capacity of one unit A to be 20,000 pounds it is evident that the total capacity of the outer units of the series A will be five times 20,000 or 100,000 pounds. Similarly in the case of the inner series, the capacity thereof will be nine times that of each unit B. The total movement or compression stroke of the spring will correspond to the amount of offset of one end 19 with respect to the other end of the same unit and in this connection it may be stated that the pitch of the inner units B is made sufficiently steeper than the pitch of the outer units A so that the offset of the ends 20—20 of each unit B is equal to the offset of a pair of ends 19—19 of an outer unit A so that both series A and B will have the same stroke.

With a spring constructed as above described, it is evident that the units may be readily formed entirely by machinery since lengths of rods may be cut off square, do not require any forging, and can be fed into a coiling machine without being specially held by tongs in the hand of an operator. It will also be noted that the total capacity is many times that of a spring of continuous helical form such as now used, assuming equivalent qualities of metal, pitch, and pitch diameters.

I have herein shown and described what I now consider the preferred manner of carrying out the invention but the same is merely illustrative and I contemplate all changes and modifications that come within the scope of the claims appended hereto.

I claim:

1. A high capacity shock absorbing spring comprising a plurality of separate individual like helical coils in parallel abutting relation, each coil extending thru an arc of approximately 360°.

2. A high capacity shock absorbing spring comprising a plurality of separate individual-like helical coils in parallel abutting relation, each coil extending thru an arc of approximately 360°, each of said coils having its ends formed flat in a plane perpendicular to the axis of the coil-forming rod.

3. A high capacity shock absorbing spring comprising a plurality of separate, individual, like helical coils in parallel abutting relation with their axes coinciding, each coil extending thru an arc of approximately 360° and having its ends squared off, one squared end of each coil partially overlapping the opposite end of the same coil and an end of the next adjacent coil.

4. A high capacity shock absorbing spring comprising outer and inner nested series of coils, each series being composed of a plurality of separate individual helical coils in parallel abutting relation in axial alinement, each coil extending thru an arc of approximately 360°, the pitch of the coils of the inner series being steeper than the pitch of the outer series such that the compression movement of the coils of both series will be substantially equal.

5. A high capacity shock absorbing spring comprising outer and inner nested series of coils, each series being composed of a plurality of separate individual helical coils in parallel abutting relation in axial alinement, each coil extending thru an arc of approximately 360°, the pitch of the coils of the inner series being steeper than the pitch of the outer series such that the compression movement of the coils of both series will be substantially equal, the ends of each coil being formed flat in a plane perpendicular to the axis of the coil-forming rod.

6. A high capacity shock absorbing spring comprising outer and inner nested series of coils, each series being composed of a plurality of separate individual, like helical coils in parallel abutting relation in axial alinement, each coil extending thru an arc of approximately 360°, the pitch of the coils of the inner series being steeper than the pitch of the outer series such that the compression movement of the coils of both series will be substantially equal.

7. A high capacity shock absorbing spring, comprising a plurality of separate helical coils, all of like shape and construction abutting one another, each coil extending through an arc of 360°.

In witness that I claim the foregoing I have hereunto subscribed my name this 24th day of Jan., 1921.

JOHN F. O'CONNOR.

Witnesses:
CARRIE GAILING,
UNA C. PERIN.